Aug. 14, 1962 W. R. JOHNSON 3,049,589

TRANSDUCING SYSTEM USING CONTROLLED DELAY LINES

Filed Nov. 10, 1959 2 Sheets-Sheet 1

INVENTOR:
Wayne R. Johnson
By Smyth & Roston
Attorneys,

Aug. 14, 1962 W. R. JOHNSON 3,049,589

TRANSDUCING SYSTEM USING CONTROLLED DELAY LINES

Filed Nov. 10, 1959 2 Sheets-Sheet 2

INVENTOR:
Wayne R. Johnson

By Smyth & Roston
Attorneys, 3,049,589

TRANSDUCING SYSTEM USING CONTROLLED DELAY LINES

Wayne R. Johnson, Los Angeles, Calif., assignor to Minnesota Mining and Manufacturing Company, St. Paul, Minn., a corporation of Delaware Filed Nov. 10, 1959, Ser. No. 852,039
11 Claims. (Cl. 178—6.6)

This invention relates to transducing systems for reproducing signals recorded as a number of parallel tracks on a magnetic recording medium and, more particularly, to such systems for securing an accurate phase relationship between the signals reproduced from the different tracks.

Multichannel recording and reproducing systems are disclosed in the Patent 2,794,066 issued to John T. Mullin on May 28, 1957 and in the Patent 2,813,927 issued to Wayne R. Johnson on November 19, 1957. In such systems, a number of parallel tracks on a magnetic recording medium are utilized for recording television signals. A number of tracks are utilized in order to record the entire television band including frequency components higher than the upper frequency reproducing limit of a system utilizing a single channel.

The successive instantaneous values of the signal to be recorded are modulated on different, phase displaced carrier waves of a common frequency. The successive carrier waves upon which the successive instantaneous values are recorded are retarded in phase by like increments so that, considered collectively, the various carriers provide a succession of wave crests substantially uniformly spaced in time, with the successive crests representing successive samples of the signal to be recorded.

In reproducing or decoding the recorded signals, separate trains of modulated signals are reproduced from the recording tracks. The separate trains of modulated signals are decoded utilizing individual trains of pulses coinciding in frequency and phase with the respective crests. Each train is intermodulated in this manner to produce a series of pulses representing instantaneous amplitudes of the original signal. The pulses derived from each track are then combined to reconstitute a signal which is essentially the same as the original signal.

When the signals are reproduced from the several channels, it is necessary that the signals recorded on the various tracks be phased with great accuracy in order to provide for a high quality picture. For practical television systems, a misalignment of 1/18,000 of an inch between the recording and reproducing heads results in a phase displacement of 180 degrees or a complete reversal of the sign of the frequency that is desired to be reproduced. Permanent misalignments of heads as between different recording and reproducing apparatus may be compensated for by fixed adjustments and are, therefore, not too serious. What are serious, however, are transient misalignments due to flutter and skew of the tape. Flutter is due to vibration of the tape as it passes from the guide roller to either the recording or reproducing head. Skew may occur because the sides of the tape are not cut so that they are absolutely parallel or because of a temporary or permanent misalignment of the tape feed. Both effects result in the heads reproducing individual tracks engaging the various tracks in echelon instead of strictly in line with a consequent relative phase displacement in the reproduced signals.

In a Patent 2,828,478 issued to Wayne R. Johnson on March 25, 1958, a system is disclosed for correcting each phase variation. In the system, a cyclically repeating reference signal of different character from the message signals between which phasing is desired is recorded simultaneously on each track so that it will be reproduced in each channel of the pick-up mechanism. The reproduced signals in each channel are introduced to individual delay lines which are adjustable by varying an electrical bias applied thereto. This invention is an improvement of the system disclosed in Johnson Patent 2,828,478.

When the delay produced by each of the delay lines is varied, its characteristic impedance varies therewith. In a specific illustrative embodiment of this invention, each end of each delay line is terminated in a variable impedance which is simultaneously varied with the delay line by the electrical bias which is also utilized to control the delay line. The variable impedance at the input to the delay line is varied by a composite signal including one component derived from the electrical bias and a second component derived from the input video signals reproduced from the tape.

The dual control compensates both for impedance variations in the delay line by matching the terminating impedance to the characteristic impedance of the delay line and also for variations in video current as delivered to the delay line. The delay provided by the delay line varies with the magnitude of the video current. The video signals are therefore delivered to the delay line by a substantially constant current. Though the current to the delay is from a substantially constant video amplifier current source, even small variations of current provide for material differences in delay. The video signal component to the input variable terminating impedance compensates for such variations. The variable impedance at the output of the delay line is varied by the electrical bias component alone which adjusts the output impedance to match the characteristic impedance of the delay line.

The electrical bias to the delay line and to the two terminating impedances is derived from a phase discriminator. The phase discriminator compares the phase of a signal derived from a master signal source with the output phase of the signal from the particular channel. The master signal source includes a comparator source of signals of the same nominal frequency as the reference signals combined with the video signals at that recording apparatus, and also a phase discriminator for comparing the phase of the comparator signals with the phase of the reproduced reference signals at the output of one of the channels. The master signal source also includes an integrating circuit for averaging the error signal from the phase discriminator. The signal from the master signal source, which changes slowly so that recurrent changes of phase such as due to flutter are cancelled out, is provided to the phase discriminator in each of the channel circuits. The electrical bias developed in each of the channel circuits represents, therefore, changes of bias both due to skew, or other relatively slow changing factors, as well as flutter or other relatively fast changing factors.

Further features of this invention relates to the provision of balancing means for separating the electrical bias components from the video signals coupled through the delay lines. The balancing means receives a composite signal including the video and bias components and also a signal including bias components alone. The two signals are effectively subtracted to remove the bias components. Still further features relate to a push-pull arrangement for automatically balancing out the electrical bias components while amplifying the video signals coupled through the delay lines.

Further advantages and features of this invention will become apparent upon consideration of the following description when read in conjunction with the drawing wherein.

Figure 1:
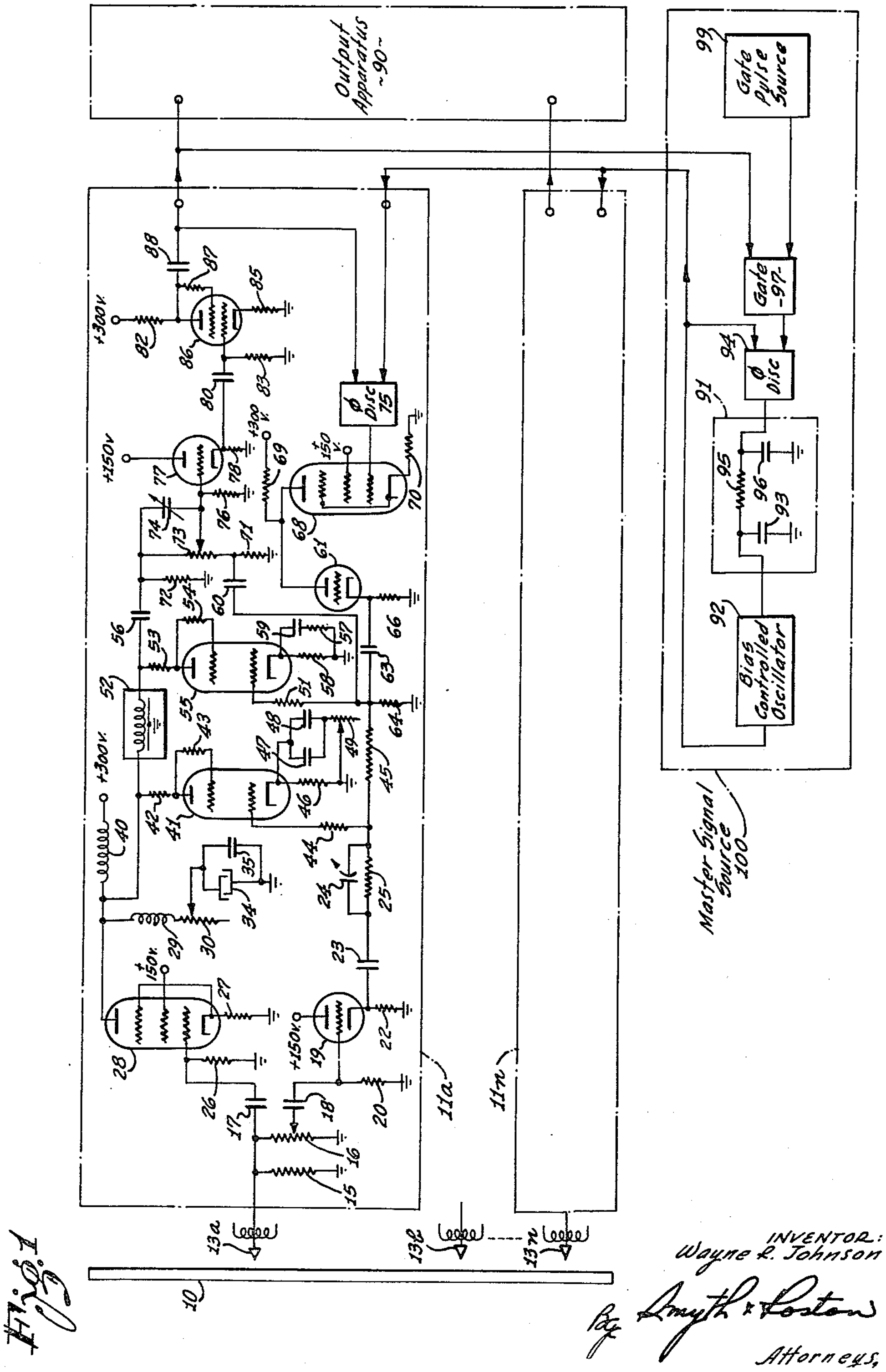
FIGURE 1 is a circuit representation of a first embodiment of the transducing system of this invention.

Referring first to FIGURE 1, a magnetic tape 10 shown in cross section is driven adjacent a number of magnetic heads 13*a* through 13*n*. The equipment for driving the magnetic tape, which is conventional, is not shown. The signals recorded on a number of magnetic tracks on the tape 10 may be samplings of conventional video signals. In the above-identified patents by Mullin and Johnson, sampling and recording apparatus is disclosed for recording the sampled video signals on a number of magnetic tracks. The video signals are sampled by a number of relatively low frequency sampling waves which are each of the same frequency but which are phase displaced from each other. The magnitude of the recorded samples is determined by the video signals which are sampled. Because of the phase displacement, the reproducing heads 13*a* through 13*n* are successively energized to provide the sampled pulses. The reproducing heads 13*a* through 13*n* are successively energized by the magnetic tracks positioned respectively adjacent thereto. The magnetic heads 13*a* through 13*n* are coupled respectively to individually associated channel circuits 11*a* through 11*n*. The channel circuits 11*a* through 11*n* are identical and the circuit details only of the channel circuit 11*a* are depicted. The channel circuit 11*a* controls a master signal source 100 which is utilized to adjust the phasing of the signals coupled through the channels 13*a* through 13*n*. The operation of the master signal source 100 is hereinafter described.

The nominal repetition rate of the reproduced sampling pulses from each of the channels on the magnetic tape 10 illustratively may be 169.5 kilocycles per second. During the horizontal or vertical blanking intervals of the video signals which are represented by the recorded sampling pulses a reference signal of predetermined frequency may be recorded in the tape channel associated with the channel circuit 11*a*. The reference signal is recorded in only one channel which effectively becomes a master control channel. As is hereinafter described, the phase of the reproduced reference signal is monitored in the master signal source 100.

The reproduced signals from the recording head 13*a* are introduced across a resistor 15 and a potentiometer 16. The resistor 15 may have a suitable value such as 100 ohms and the potentiometer 16 may have a suitable value across end terminals of 250 ohms. As is hereinafter described, the potentiometer 16 is utilized to adjust the magnitude of balancing control signals introduced to a terminator tube 41. One end terminal of the potentiometer 16 is coupled by a capacitor 17 to the control grid of a video amplifier tube 28 and the other end terminal is grounded. The adjustable tap of the potentiometer 16 is coupled through a capacitor 18 to the control grid of a cathode follower tube 19. Only a fraction of the video signals introduced to the amplifier tube 28 are, therefore, introduced to the cathode follower tube 19, with the setting of the potentiometer 16 determining the fraction. The capacitors 17 and 18 may have suitable values such as .01 microfarad each, and the tubes 28 and 19 may illustratively be types 6AH6 and one half of a type 6C4 respectively.

The video signals to the video amplifier tube 28 are introduced across the conventional grid leak resistor 26 which may have a value of 410 ohms. The cathode of the pentode 28 is connected to ground by a resistor 27, which may be 150 ohms, and also to the suppressor grid. The screen grid of the pentode 28 is connected to a positive potential source which may have a value of 150 volts. Anode potential is provided from a positive potential source having a value of 300 volts through an inductor 40 which may have a suitable value such as 25 millihenries. The inductor 40 provides for a high impedance path for the video signals to the anode potential source but a low impedance path for direct currents therefrom. The anode of the pentode 28 is also connected by an inductor 29 and a rheostat 30 to two grounded capacitors 34 and 35. The inductor 29 may have an inductance of 68 microhenries, the rheostat 30 may have a maximum resistance of 25 ohms and the capacitors 34 and 35 may respectively have capacitances of 20 and .01 microfarads. The rheostat 30 is adjustable to vary the A.C. anode potential.

The video amplifier, including the pentode 28, forms a high impedance amplifier having an output impedance in a range from 50 to 100 kilohms. For relatively small video currents through the tube 28, the amplifier functions as a constant current source because of its high impedance. For relatively large currents, the output impedance changes somewhat and the video currents vary inversely therewith.

The current provided by the video amplifier tube 28 varies with the strength of the reproduced input signals and with the magnitude of the impedance coupled to the output of the amplifier. The impedance presented to the pentode 28 includes an adjustable delay circuit or saturable delay line 52 which couples the amplified video signals from the video amplifier through a capacitor 56 across a grounded resistor 72. The capacitor 56 may have a capacitance of 0.12 microfarad, and the resistor 72 may have a suitable value such as 1,800 ohms. The delayed video signals which appear across the resistor 72 are introduced to one end of a potentiometer 73 which may have a resistance between end terminals of 50 kilohms.

As is hereinafter described, control or bias signals utilized for adjusting the delay provided by the saturable line 52 are introduced to the other terminal of the potentiometer 73. The control signals are derived by matching the phase of the output signals from the channel circuit 11*a* with the phase of signals from a bias-controlled oscillator 92 in the master signal source 100. As is also hereinafter described, the oscillator 92 is adjustable also in accordance with the output signal from the channel circuit 11*a*. The signal from the bias controlled oscillator 92 is introduced in parallel to each of the channel circuits 11*a* through 11*n*. In the channel circuit 11*a*, the signal from the oscillator 92 is compared with the output signal from the channel circuit 11*a* in a phase discriminator 75. Any variation between the phase of the signal from the oscillator 92 and at the output of the channel circuit 11*a* provides for an error signal having a magnitude and polarity indicative of the magnitude and direction of the variation.

The error signal is introduced to a control amplifier arrangement including a pentode 68 which may be a type 6U8 tube. The error signal is received at the control grid of the pentode 68. The cathode of the pentode 68 is connected to ground by a cathode resistor 70 which may have a resistance of 30 kilohms, and to the suppressor grid. The screen grid of the pentode 68 is biased by a plus 150 volt potential source and the anode of the tube is connected to a plus 300 volt anode potential source by a resistor 69 which may have a suitable value such as 33 kilohms.

The amplified control signal from the pentode 68 is introduced to a cathode follower arrangement including a triode 61 which may be the second half of the double triode 6C4, with the triode 19 forming the first half of the double triode. The anode of the triode 61 is connected to the plus 300 volt potential source and its cathode is connected by a cathode resistor 66 to ground. The cathode resistor 66 may have a suitable value such as 120 kilohms.

The control signal from the cathode of the triode 61 is coupled across a grounded resistor 64 which may have a suitable value such as 330 kilohms. The resistor 64 forms part of two different grid leak circuits: One for the terminating impedance tube 41, briefly mentioned above; and the other for a terminating impedance tube 55. The two tubes 41 and 55, which may both be of the type 6S50 tetrodes, are coupled to opposite ends of the adjustable delay line 52. The signal across the resistor 64 is provided through a resistor 45 and a resistor 44 to the control grid of the tube 41. The resistors 45 and 44 may have suitable values such as 180 kilohms and 100 ohms, respectively. The video signals through the cathode follower tube 19, which was also briefly mentioned above, are introduced to the junction between the resistors 44 and 45.

As described above, the input video signals are coupled through the potentiometer 15 and the capacitor 18 to the control grid of the tube 19. The control grid is coupled to ground by a conventional grid leak resistor which may have a suitable value such as 200 ohms. The anode of the tube 19 is connected directly to a positive potential source, which may have a value of 150 volts, and its cathode is coupled to ground through a cathode resistor 22 which may have a value of 1 kilohm. The output from the cathode follower tube 19 is taken from its cathode and coupled through a coupling capacitor 23 and a resistor 25 to the junction between the resistors 44 and 45. The coupling capacitor 23 may have a value of 0.001 microfarad and the resistor 25 may have a value of 180 kilohms. The resistor 25 is shunted by an adjustable capacitor 24 having a capacitive range between 7 and 45 microfarads. The resistor 25, and the resistor 45, form a voltage divider arrangement for adding the video signals through the cathode follower tube 19 to the control signals through the cathode follower tube 61. The reason that a cathode follower tube 19 is utilized is to prevent the control signals from the cathode follower tube 61 from being coupled to the video amplifier 28. The cathode follower 19, therefore, isolates the video input from the control signals and the cathode follower 61 performs the reverse function.

Respective magnitudes of the two signals at the control grid of the terminating tube 41 are determined by the relative magnitudes of the resistors 25 and 45 which are serially coupled between the two cathode follower tubes 19 and 61 and by the adjustment of the potentiometer 16. Anode potential is provided for the tube 41 from the plus 300 volt potential source through the inductor 40 and an anode resistor 42. The resistor 42, which has a suitable value such as 33 ohms, is connected by a resistor 43, which may have a value of 100 ohms, to the screen grid of the tube 41. The cathode of the tube 41 is coupled to ground by a parallel arrangement having one branch consisting of a resistor 46 and the other branch consisting of two capacitors 47 and 48, in parallel, and a rheostat 49. The resistor may have a value of 250 ohms and the rheostat 49 may have a maximum resistance of 500 ohms. The rheostat 49 is, illustratively, set at a value of 250 ohms. The capacitors 47 and 48 may have capacitances of 0.1 microfarad and 1,000 micromicrofarads, respectively.

The purpose of the impedance tube 41 is to provide a constant terminating input impedance for the delay line 52. As the current through the video amplifier 28 decreases, and the potential at its anode becomes more positive, the video signal through the cathode follower tube 19 to the control grid of the tube 41 becomes less positive to provide for an increase of impedance across the tube 41. There is no phase inversion through the cathode follower tube 19 though the video amplifier 28 phase reverses the video signals. A signal which provides, therefore, for a decrease of current through the tube 28 provides for an increase of output potential from the tube 28 and an increase of shunt impedance presented by the terminating tube 41. Any change of impedance, therefore, of the video amplifier tube 28 is automatically compensated for by the terminating tube 41 so that input to the delay line 52 appears as a constant current source.

Figures 2, 3:
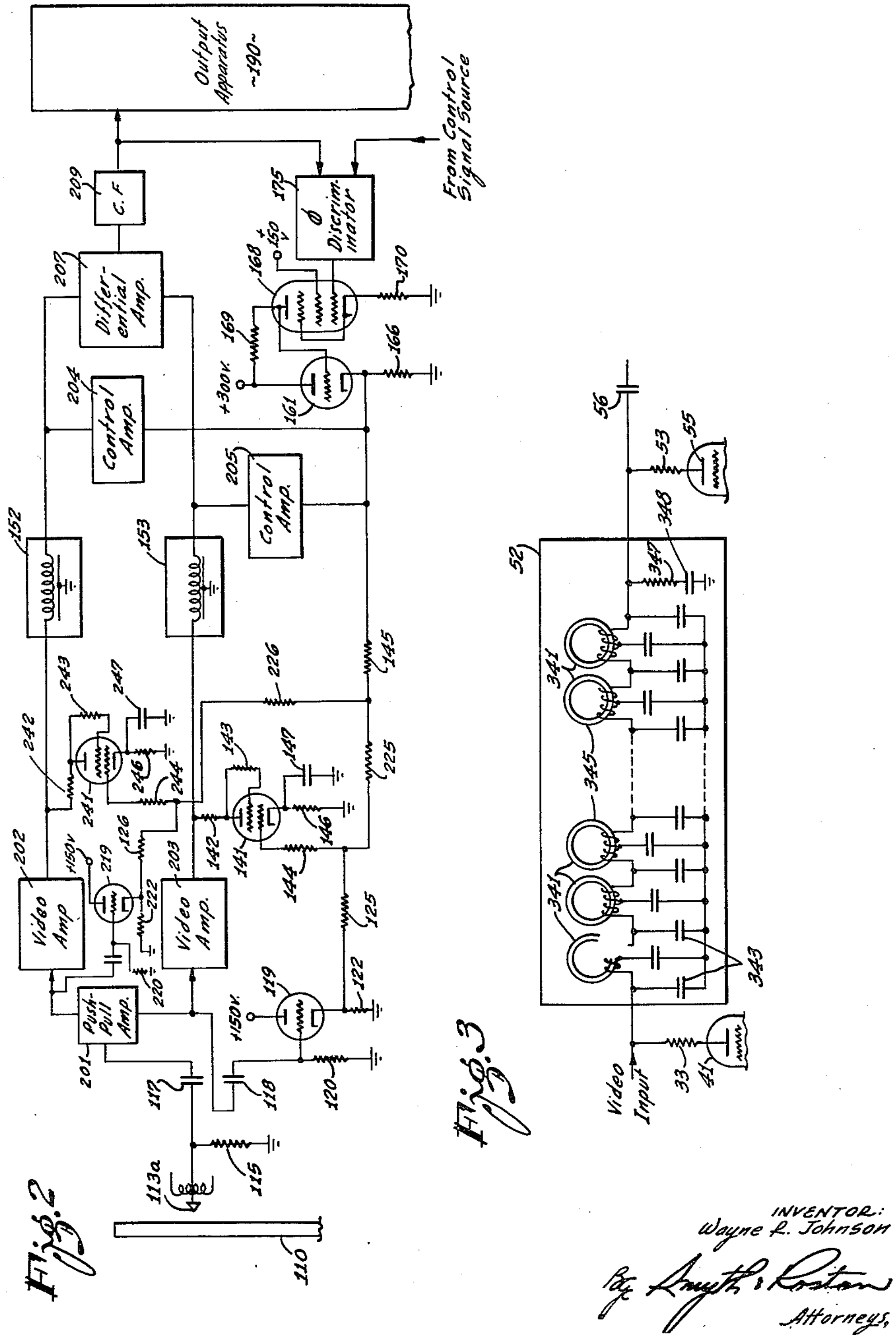
FIGURE 2 is a circuit representation of a second embodiment of a transducing system of this invention.
FIGURE 3 is a circuit representation of a variable delay line utilized in either of the first or second embodiments of this invention.

The adjustable delay line 52, one form of which is shown particularly in FIGURE 3, includes a network of series inductive elements 341 and shunt capacitive elements 343. Each inductive element 341 comprises a toroidal core 345 preferably of ferrite or other high resistance, low loss material having ferro-magnetic property. Being ferromagnetic, the effective permeability of these cores varies with the degree of their magnetic saturation. The toroidal cores 345 illustratively may have outside diameters of ⅜ of an inch, inside diameters of ⅛ inch and may support 20 turn, center tapped windings. The variable delay line 52 including the inductive elements 341, may have a maximum characteristic impedance of approximately 1,000 ohms with a 20 section line, having a maximum delay of 2.5 microseconds. The delay line 52 is terminated by a resistor 347 which is connected to ground through a blocking capacitor 348. The resistor 347 may have a suitable value which matches the maximum impedance of the delay line which, as indicated above, is 1,000 ohms.

The terminating tube 41 is connected to the input of the variable delay line 52, as indicated in FIGURE 3, and the terminating tube 55 is coupled to its output. The tube 55 operates both to vary the saturation of the cores 345 and to form a variable terminating impedance for the adjustable delay line. The terminating impedance for the delay line 52 is automatically adjusted with the changes of the delay provided by the line 52 in order to provide for video signals of constant voltage level.

As described above, the terminating tube 55 receives the control signal from the cathode follower tube 61. The signal is introduced through a resistor 51 which, together with the resistor 64, forms a grid leak path for the terminating tube 55. The resistor 51 may have a suitable value such as 1,000 ohms. The circuit arrangement for the terminating tube 55 may be substantially similar to the circuit arrangement including the terminating tube 41. The cathode is coupled to ground by a parallel circuit having a resistor 58 in one branch and a serially connected capacitor 59 and resistor 57 in the other branch. The resistors 58 and 57 may both be 250 ohm resistors and the capacitor 59 may have a value of 0.05 microfarad. The anode of the tube 55, as indicated above, is connected by a resistor 53 to the output of the variable delay line 52 and it is also coupled by a resistor 54 to the screen grid of the tube 55. The resistors 53 and 54 may have suitable values such as 33 ohms and 100 kilohms respectively. Video signals through the delay line 52, adjusted by the terminating tube 55, are coupled through the coupling capacitor 56 across the terminating resistor 72. The capacitor 56 may have a capacitance of 0.12 microfarad and the resistor 72 may have a resistance of 1,800 ohms.

The signal across the resistor 72, which consists of the video signals at a constant voltage level and also a control signal component due to the operation of the terminating tubes 41 and 55, is introduced to one end of the potentiometer 73 which was briefly mentioned above. The video signals are shunted to the adjustable terminal of the potentiometer 73 by an adjustable capacitor 74 which may have a capacitive range between 4 and 30 micro-microfarads. The control signals, however, which appear across the resistor 72 are relatively low frequency signals compared to the frequency of the video signals and, therefore, are not shunted across the upper portion of the potentiometer 73.

The other or lower terminal of the potentiometer 73 receives the control signals from the triode 61, which signals function to balance the control signals provided across the resistor 72. The control signals to the lower terminal of the potentiometer 73 are provided from the cathode follower tube 61 through a coupling capacitor 60 across a resistor 71. The capacitor 60, which may have a value of 0.01 microfarad, and the resistor 71, which may have a value of 5,600 ohms, form a high band pass filter for coupling the control signals to the potentiometer 73. The control signals from the cathode follower tube 61 through the capacitor 60 are not phase reversed whereas the control signals appearing across the resistor 72 are phase reversed due to the operation of the tube 55. The potentiometer 73 is adjusted so that the magnitude of the phase reversed signals is the same as the magnitude of the signals having no phase reversal so that they balance out. The signals appearing at the adjustable terminal of the potentiometer 73, therefore, consist solely of the video signals which have been phase adjusted by the delay line 52 and maintained at a constant voltage level due to the operation of the terminating tubes 41 and 55.

The video signals from the potentiometer 73 are introduced to the control grid of a cathode follower tube 77 which may be ½ of a type 6C42 tube. The control grid of the tube 77 is coupled to a conventional grid leak resistor 76 which may have a value of 100 kilohms. The anode of the tube 77 is directly connected to a plus 150 volt potential source, and its cathode is connected to ground by a cathode resistor 78 which may have a value of 2 kilohms. The video signals, isolated by the cathode follower tube 77, are coupled from its cathode through a high pass coupling capacitor 80 to the control grid of a video amplifier 86. The capacitor 80 may have a value of 160 micromicrofarads, and the control grid of the tube 86 is coupled by a grid leak resistor 83 having a suitable value such as 470 kilohms. The cathode of the tube 86 is connected to a grounded cathode resistor 85 having a value of 47 ohms, and the anode of the tube 86 is connected to a plus 300 volt potential source by an anode resistor 82. The anode is also connected by a resistor 87 to the screen grid of the tube 86. The resistors 82 and 87 may have suitable values such as 3 kilohms and 100 ohms, respectively.

The amplified video signals from the tube 86 are provided through a coupling capacitor 88 to output apparatus 90. The capacitor 88 may have a value of 1 microfarad, and the output apparatus 90 may be any arrangement or equipment which receives video signals. For example, it may be a circuit arrangement for combining the video signals received through the channel circuits **11*a* through 11*n* to provide a composite video signal which is similar to the original video signal introduced to a multichannel recording system. Each of the channel circuits 11*a* through 11*n* are similar with each providing video signals from associated tracks on the magnetic tape 10 to the output apparatus 90**.

The video signals from the channel circuit **11*a* are also introduced to the master signal source 100, which was mentioned above. In the signal source 100, the video signals from the channel circuit 11*a* are introduced to a gate 97 which is periodically enabled by a gate pulse source 99. The source 99 supplies enabling pulses to the gate 97 to periodically couple the video signals from the channel circuit 11*a* to a phase discriminator 94. The video signals from the channel circuit 11*a* include a reference signal described above which appears periodically during the blanking pulses of the video signals. The particular invention is not restricted to the utilization of a video reference signal which is distinguished on a time basis from the other signals on the channel, as a continuous reference signal may be multiplexed with the video signals in which case a gate 97** would not be required.

The signals from the channel circuit **11*a*, supplied either directly to the phase discriminator 94 or through the gate 97, are compared with the signals from the bias control oscillator 92. The purpose of the discriminator 94 is to develop a signal which depends in polarity and magnitude on the relative phase of the reference signal from the channel circuit 11*a***. Double balanced modulators, biased diodes or multi-electrode tubes may be used for such phase discriminators with many forms of each being known in the art.

The error signal from the discriminator 94 is integrated by a low pass filter circuit 91, which includes a series resistor 95 and two shunt capacitors 96 and 93 connected respectively to the two ends of the resistor 95. The circuit 91 has a relatively long time constant in comparison with the minimum frequency of flutter so that the error signal, as developed at the output of the circuit 91, is averaged over many cycles of the signal from the channel circuit **11*a***. Recurrent changes of phase such as due to tape flutter area, in this manner, cancelled.

The error signal which is developed by the circuit 91 is applied to the bias control oscillator 92. The oscillator 92 is an adjustable frequency oscillator which may either be a reactance control sine wave oscillator or a multivibrator whose frequency of operation depends upon its bias or supply voltage. The oscillator 92 develops a comparison signal which is fed back to the phase discriminator 94 and which is also introduced to each of the channel circuits **11*a* through 11*n*. The frequency of the comparison signal varies as the average frequency of the reference signal from the channel circuit 11*a* varies, but it disregards short-term variations in frequency such as are due to flutter. The phase discriminator 94 compares the phase of the comparison frequency signal from the oscillator 92 with the phase of the reference signal from the channel circuit 11*a* and the signal from the source 100** represents differences therebetween.

The comparison signal to each of the channel circuits **11*a* through 11*n* is introduced to the respective phase discriminators 75. There is one phase discriminator 75 in each of the channel circuits 11*a* through 11*n* and each of the discriminators 75 may be similar to the phase discriminator 94 described above. The phase of the comparison signal is compared in each of the phase discriminators 75 with the phase of the reference signal in the output of the respective channel circuits 11*a* through 11*n*. The error signal developed by the phase discriminators 75 are introduced to their associated control amplifier tubes 68. The error signal varies in accordance with the flutter frequency at the output of the respective circuits 11*a* through 11*n* and is utilized to vary the delay of the delay line 52. The tubes 41 and 55 are also adjusted in accordance with the control signal to maintain a constant characteristic impedance, as described above. The control signal from the discriminator 75 includes, therefore, two components: one, which is similar for each of the channel circuits 11*a* through 11*n*, is developed by the signal source 100; and the other, which is peculiar to the particular channel, is developed by comparing the signal from the source 100** with the phase of the respective output signal.

In the embodiment shown in FIGURE 2, a push-pull arrangement is utilized for balancing out the control signals so that the output of each channel circuit consists solely of the video signals at a constant voltage level and compensated for phase variations such as due to skew or flutter. FIGURE 2 illustrates the circuit arrangement of one of the circuit channels. The master signal source, not shown in FIGURE 2, is similar to the source 100 in FIGURE 1, and each of the other channel circuits are similar to the depicted channel circuit. The components in FIGURE 2 which are similar to the components in FIGURE 1, have been given similar reference designations with the addition of 100. For example, the magnetic tape 110 in FIGURE 2 is similar to the magnetic tape 10 in FIGURE 1.

The signals recorded on one track of the magnetic tape 110 are reproduced by the head **113*a* and introduced to a push-pull amplifier 201 which provides for two out-of-phase outputs. The push-pull amplifier 201 supplies the two out-of-phase outputs or sets of video signals respectively through the video amplifiers 202 and 203 to the delay lines 152 and 153. The video amplifiers 202 and 203 are similar to the video amplifier including the tube 28 in FIGURE 1, and the delay lines 152 and 153 are similar to the delay line 52 in FIGURE 1. The video signals are also coupled from the push-pull amplifier 201 respectively through two similar cathode follower tubes 119 and 219 to two control amplifier arrangements including respectively the tubes 141 and 241. The tube arrangements, respectively including the tubes 141 and 241, are substantially similar to the control amplifier arrangement including the tube 41 in FIGURE 1. The impedance presented by each of the control amplifier arrangements varies, therefore, in accordance with the video signals and it also varies in accordance with a control or bias signal developed by the phase discriminator 175**.

The control signal is amplified through the pentode 168 and coupled through the cathode follower tube 161 to two control amplifiers 204 and 205. Each of the control amplifiers 204 and 205 may be similar to the control amplifier including the tube 55 in FIGURE 1. The control signals, therefore, vary the terminating impedance of the delay lines 152 and 153 in accordance with the detected phase error and at the same time the delay provided by the delay lines 152 and 153 is adjusted to compensate for these errors. The control signal is also introduced through the resistors 226 and 225, respectively, to the two tubes 241 and 141 to adjust the input impedances of the delay lines 152 and 153.

The video signals from the delay lines 152 and 153 which are out-of-phase with each other, are introduced to the input terminals of a differential amplifier 207 and, accordingly, add. The control signal components due to the operation of the control amplifiers 204 and 205 and also the tubes 241 and 141, which are also introduced to the differential amplifier 207, however, cancel. The control signal components cancel because they are in phase with each other as received at the two input terminals of the differential amplifier 207. The amplified video signals from the differential amplifier 207 are coupled through a cathode follower 209 to the output apparatus 190. The operation of the rest of the system is similar to that described above with reference to FIGURE 1.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In apparatus for reproducing signals recorded on a medium, including,
   means for providing a reference signal,
   means disposed relative to the medium for reproducing the signals from the medium,
   a push-pull amplifier connected to the reproducing means to provide the reproduced signals in opposite phase,
   first and second delay lines having input and output ends and connected at their input ends to the push-pull amplifier to receive the reproduced signals in the opposite phase relationship and variable in delay characteristic in response to a control signal,
   a differential amplifier connected to the first and second delay lines at the output ends of the delay lines to produce signals representing an average of the signals passing through the first and second delay lines from the reproducing means,
   a discriminator connected to receive said reference signal and signals from said differential amplifier for developing an error signal corresponding in sign and magnitude to the difference in time between said delayed reproduced signal and said reference signal,
   means operatively coupled to said discriminator and said delay lines for applying said error signal as a control signal to vary the delay of said delay lines in such a sense as to reduce said time differences, and
   first and second adjustable impedance means coupled respectively to the input and output terminals of said first and second delay lines and responsive to said error signal to match said first and said second impedance means with the characteristic impedance of said delay lines.

2. In apparatus for reproducing recorded signals including a cyclically recurring reference signal recorded at constant frequency,
   means for providing a comparison signal having a particular frequency,
   means disposed relative to the medium for reproducing the signals recorded on the medium,
   means operatively coupled to the reproducing means for providing first and second reproduced signals of opposite phase,
   first and second delay lines having input and output ends and respectively connected at their input ends to receive the reproduced signals of opposite phase and variable in delay characteristic in response to a control signal,
   differential means connected to the output ends of the delay lines to combine the signals from the delay lines in an opposite phase relationship for the production of signals representing the average of the signals passing through the delay lines,
   a discriminator connected to receive said comparison signal and the signals from said differential means for developing an error signal corresponding in sign and magnitude to the difference in time between said average signal from said delay lines and said comparison signal,
   means operatively coupled to the output ends of said delay lines for applying said error signal as a control signal to vary the delays of said delay lines in such a sense as to reduce said time differences,
   first and second adjustable impedance means coupled respectively to the input and output terminals of said first and second delay lines and responsive to said error signal to match said first and said second impedance means with the characteristic impedance of said delay lines, and
   circuit means for introducing the signals reproduced from the recording medium to said first variable impedance means which is coupled to the input terminal of said delay line so that impedance presented by said first variable impedance means is controlled by the reproduced signals as well as by the error signal.

3. In apparatus for reproducing recorded signals including a cyclically recurring reference signal recorded at constant frequency, means for maintaining a constant time relationship between the reproduced reference signal and a comparison signal of like frequency to eliminate the effects of flutter of the reproducing medium including a delay line connected to receive the reproduced signals and variable in delay characteristic in response to a control signal, a discriminator connected for receiving said comparison signal and signals from said delay line for developing an error signal corresponding in sign and magnitude to the difference in time between said delayed reference signal and said comparison signal, means for applying said error signal as a control signal to vary the delay of said delay line in such a sense as to reduce said time differences, a first and a second adjustable impedance means coupled respectively to the input and output terminals of said delay line and responsive to said error signal to match said first and said second impedance means with the characteristic impedance of said delay line, and circuit means for introducing the signals reproduced from the recording medium to said first variable impedance means which is coupled to the input terminal of said delay line so that the impedance presented by said first variable impedance means is controlled by the reproduced signals as well as by the error signal.

4. In apparatus for reproducing recorded signals including a cyclically recurring reference signal recorded at constant frequency, means for maintaining a constant time relationship between the reproduced reference signal and a comparison signal of like frequency to eliminate the effects of flutter of the reproducing medium including a delay line connected to receive the reproduced signals and variable in delay characteristic in response to a control signal, a discriminator connected for receiving said comparison signal and signals from said delay line for developing an error signal corresponding in sign and magnitude to the difference in time between said delayed reference signal and said comparison signal, means for applying said error signal as a control signal to vary the delay of said delay line in such a sense as to reduce said time differences, a first and a second adjustable impedance means coupled respectively to the input and output terminals of said delay line and responsive to said error signal to match said first and said second impedance means with the characteristic impedance of said delay line, a balancing circuit arrangement coupled to said delay line for removing any error signal components introduced to the reproduced signals from the recording medium by said first and second variable impedance means, and circuit means for introducing the signals reproduced from the recording medium to said first variable impedance means which is coupled to the input terminal of said delay line so that the impedance presented by said first variable impedance means is controlled by the reproduced signals as well as by the error signal.

5. In apparatus for reproducing in a number of channels signals recorded as a plurality of parallel tracks on a single recording medium, each of said signals including a common cyclically recurring reference signal simultaneously recorded on all of said tracks: means for phasing and synchronizing the reproduced signals to eliminate the effects of flutter of the recording medium and misalinement of reproducing heads with respect to said tracks comprising: a master oscillator tuned to operate at a mean frequency integrally related to the frequency of said reference frequency and variable from said mean freqency in response to a control voltage, means for developing from said oscillator frequency a train of signals recurring at substantially said reference frequency, a delay line in each of said channels which is variable in delay in response to an electrical bias applied thereto, a terminating impedance for each end of said delay line also variable in response to an electrical bias, a feedback loop connected to the output of the delay line in one only of said channels and comprising a discriminator responsive to said reference signal and connected to compare the time relation of said reference signal to said train of signals to develop an error signal dependent in sign and magnitude on the relative timing of the compared signals, and an integrating circuit of relatively long time constant connected to apply the average value of said error signal as a control voltage to said oscillator; a plurality of additional feedback loops connected respectively to the outputs of the delay lines in each of said channels including said one channel and each including a discriminator connected to compare the time relation of said reference signal and said train of signals to develop an error signal dependent in sign and magnitude on the relative timing of the signals compared thereby, circuit means connected to provide said electrical bias to said delay line and said terminating impedances in such sense as to vary the delay in the connected delay line to correct errors in time relationship and to vary the impedance of each of the terminating impedances to match the change of characteristic impedance of the delay line due to its variation by the electrical bias and circuit means connected to at least one of said terminating impedances for controlling said terminating impedance to which it is connected in accordance with variation in current to said terminating impedance at the beginning end of said delay line.

6. In apparatus for reproducing signals recorded on a medium, including, means disposed relative to the medium for reproducing the signals recorded on the medium, means operatively coupled to the reproducing means for providing first and second reproduced signals of opposite phase, means for providing comparison signals, delay lines having input and output ends and connected at their input ends to receive the reproduced signals of opposite phase and variable in delay and impedance characteristics in response to a control signal, first and second differential means connected to the output ends of the delay lines to obtain an addition of the reproduced signals of opposite phase from the delay lines and a subtraction of signals of the same phase from the delay line, discriminator means connected to receive the signals from the differential means and the comparison signals to provide error signals representing differences in phase between the comparison signals and the average of the reproduced signals passing through the first and second delay lines, first and second impedance means respectively terminating the input and output ends of said first delay line and variable in value in response to the error signals and signals from said delay line to match the impedance of the first and second impedance means to the impedance of the delay line, and third and fourth impedance means respectively terminating the input and output ends of said second delay line and variable in value in response to the error signals and signals from said delay line in the same phase as the first delay line to match the impedance of the first and second impedance means to the impedance of the second delay line.

7. In combination for reproducing signals recorded on a recording medium, transducer means coupled to the recording medium for reproducing the recorded signals, an amplifier coupled to said transducer means for amplifying the reproduced signals;

an adjustable delay circuit coupled to said amplifier for delaying the amplified signals, said delay circuit having a beginning end coupled to said amplifier, a terminating end, and an impedance characteristic which changes with adjustments thereof when the delay is varied, a source of comparison signals, means coupled to said terminating end of said delay circuit and to said source for detecting any phase difference between the delay signals and the comparison signals and for providing a control signal in accordance therewith, means coupled to said detecting means for adjusting said delay circuit in accordance with the control signal to compensate for the detected difference in phase, a variable impedance coupled to the beginning end of said delay circuit and controlled by the control signal for adjusting the impedance coupled to the beginning end of said delay circuit to match the characteristic impedance of said delay circuit, a variable impedance coupled to the terminating end of said delay circuit and controlled by the control signal for adjusting the impedance coupled to the terminating end of said delay circuit to match the characteristic impedance of said delay circuit, and circuit means coupled to said transducer means for controlling said variable impedance connected to the beginning end of said delay circuit to compensate for variations in current from said amplifier to said delay circuit.

8. In combination in accordance with claim 7, in addition, balancing means coupled to the terminating end of said delay circuit and to said detecting means for cancelling any control signal component appearing with the delayed signals from said delay circuit.

9. In combination, a delay line having input and output terminals and including a plurality of members having impedances dependent upon the voltage applied to the members and providing delays in the passage of signals in accordance with the values of the impedances, a source of voltage connected to the input terminal of the delay line to energize the delay line, a source of signals coupled electrically to the input terminal of the delay line for a passage of the signals through the delay line with a variable delay, a variable impedance coupled electrically to the input terminal of the delay line, and circuit means coupled to said source of signals and to said variable impedance and to said input terminal of said delay line to compensate for variations in current from said source of signals to said delay line.

10. In combination in accordance with claim 9, in which the circuit means connected to said variable impedance and to the input terminal of the delay line is controlled by said source of voltage for varying the terminating impedance at the beginning end of the delay line in a direction to match the characteristic impedance of the delay line.

11. In combination in accordance with claim 10, in addition, circuit means connected to said source of voltage and to said source of signals for isolating said sources from each other but not from said variable impedance at the beginning end of said delay line.

References Cited in the file of this patent

UNITED STATES PATENTS

| | | |
|---|---|---|
| 2,828,478 | Johnson | Mar. 25, 1958 |
| 2,852,750 | Goldberg | Sept. 16, 1958 |
| 2,907,957 | Dewitz | Oct. 6, 1959 |